US 10,412,928 B1

(12) United States Patent
Qamar et al.

(10) Patent No.: US 10,412,928 B1
(45) Date of Patent: Sep. 17, 2019

(54) PUSH BUTTON OPERATED RODENT RESTRAINER

(71) Applicant: KING SAUD UNIVERSITY, Riyadh (SA)

(72) Inventors: Wajhul Qamar, Riyadh (SA); Mohammad A. Altamimi, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/237,632

(22) Filed: Dec. 31, 2018

(51) Int. Cl.
*A01K 1/06* (2006.01)
*A61D 3/00* (2006.01)

(52) U.S. Cl.
CPC .............. *A01K 1/0613* (2013.01); *A61D 3/00* (2013.01)

(58) Field of Classification Search
CPC .......... A01K 1/06; A01K 1/0613; A61D 3/00; A61D 2003/003; A61D 2003/006
See application file for complete search history.

(56) References Cited

U.S. PATENT DOCUMENTS

| | | | |
|---|---|---|---|
| 2,789,538 A * | 4/1957 | Merritt | A01K 1/0613 119/751 |
| 3,428,030 A | 2/1969 | Updegraff | |
| 4,148,280 A * | 4/1979 | Masuda | A61D 3/00 119/757 |
| 4,254,767 A | 3/1981 | Mixon, Jr. | |
| 5,184,572 A * | 2/1993 | Meier | A01K 1/0613 119/733 |
| 5,927,234 A * | 7/1999 | Siegel | A61D 3/00 119/417 |
| 6,446,579 B1 | 9/2002 | Griebling | |
| D506,581 S | 6/2005 | Marlowe | |
| 7,784,429 B2 | 8/2010 | Chiodo | |
| D641,526 S | 7/2011 | Brown et al. | |
| 8,327,804 B2 | 12/2012 | Yamada et al. | |
| 8,584,621 B2 | 11/2013 | Lee | |
| 2006/0278218 A1 | 12/2006 | Hoffman | |
| 2008/0168951 A1 * | 7/2008 | Starr | A01K 1/0613 119/751 |
| 2015/0359233 A1 * | 12/2015 | Callicrate | A22B 1/00 452/55 |

FOREIGN PATENT DOCUMENTS

WO 2013185817 A1 12/2013

OTHER PUBLICATIONS

Universal Animal Restrainers, © Supply My Lab 2018,https://www.supplymylab.com/Equipment/Restrainers/_/Universal-Animal-Restrainers?=&q=H46400-0001&gclid=EAlaIQobChMloqnG0Jqf3gIVA00GCh3_Dg-8EAQYAyABEgLC5_D_BwE.

* cited by examiner

*Primary Examiner* — Thanh Pham
(74) *Attorney, Agent, or Firm* — Richard C. Litman (57) ABSTRACT

The push button operated rodent restrainer is designed to hold a rodent in position to access their tail veins during tail vein injections or for extraction of blood. The assembly includes a base rectangular platform supporting two hinged, transparent half-cylinders. When the assembly is closed, the half-cylinders form a closed tube, which restrains the rodent. The half-cylinders are made of transparent plastic to allow laboratory staff to observe the rodent. The tube facilitates restraining the rodent and includes a longitudinal slit to allow proper ventilation while the rodent is restrained. One end of the closed tube has a slot, which allows the rodent's tail to protrude outside the tube for access to the tail. A push button mounted on a resilient lever is connected to the tube halves such that when the push button is depressed, the tube opens, and when the push button is released, the tube closes.

13 Claims, 7 Drawing Sheets

PUSH BUTTON OPERATED RODENT RESTRAINER

BACKGROUND

1. Field

The disclosure of the present patent application relates to laboratory equipment for handling animals, and particularly to a push button operated rodent restrainer.

2. Description of the Related Art

Testing and experimenting of pharmacological and toxicological compositions on laboratory animals, and in particular, on rodents, often require that compositions are administered to, or blood is taken from, the tail of the rodent. It is useful, therefore to restrain the rodent during these procedures. Prior art restrainers either require holding the tail during the procedure or are cumbersome for a single technician to operate. In addition, some prior art devices require pulling the rodent's tail to load the rodent into the device, which may cause injury to the rodent.

Thus, a push button operated rodent restrainer solving the aforementioned problems is desired.

SUMMARY

The push button operated rodent restrainer is designed to hold a rodent or small animal in position to access their tail veins in scientific investigations, such as tail vein injections or the extraction of blood. The assembly includes a base rectangular platform supporting two hinged, transparent half-cylinders. When the assembly is closed, the half-cylinders form a closed tube, which restrains the rodent. The half cylinders are made of transparent plastic to allow laboratory staff to observe the rodent. The tube facilitates restraining the rodent and includes a longitudinal slit to allow proper ventilation while the rodent is restrained. A first end of the closed tube is tapered for surrounding the rodent's snout. The opposing end of the closed tube is flat and has a slot, which allows the rodent's tail to protrude outside the restrainer body, thereby providing access to the tail for experimental purposes. A spring-biased push button is connected to the tube halves by linkages so that when the push button is depressed, the half-cylinders rotate to open the tube, and when the push button is released, the cylinders rotate in the opposite direction to close the tube and restrain the rodent. The assembly can be made in different sizes, depending on the size of the animal to be restrained.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The external components of the push button operated rodent restrainer 100 are shown in FIGS. 1-4. The restrainer 100 includes a substantially rectanguloid base 102 having a substantially rectangular top plate 104. A first transparent plastic half-cylinder housing 106 and a second transparent plastic half-cylinder housing 108 are pivotally mounted on the upper surface of the top plate 104 of the base 102. When the housings 106 and 108 are in a closed position, as shown, they form a tube within which a rodent R (which may be a mouse or rat) may be restrained. The front wall 110 of the base 102 includes an opening 112, through which a lever 500 on which a push button 114 is mounted extends. When the push button 114 is depressed, a mechanism actuated by depressing the push button 114 pivots the housings 106 and 108 to an open position, such that the rodent R may be placed within or removed from the open tube. The housings 106 and 108 each have a first flat, laterally extending end with a half-slot formed in each housing end, such that a slot 116 is formed at a first flat, laterally extending end of the tube when the housings 106 and 108 are in the closed position. The tail T of the rodent R extends out of the slot 116 for administering subcutaneous injections into the tail T or for removing blood from the tail T for experimental purposes. A centrally disposed, stationary metal barrier 118 extends vertically from the upper surface of the top plate 104 between the housings 106 and 108. The centrally disposed, stationary metal barrier 118 ensures that when the housings 106 and 108 are in the closed position, a small longitudinal slit 120 remains between the housings 106 and 108 to provide adequate ventilation for the enclosed rodent R. The base 102 houses components of the push button operated mechanism, as well as supporting the housings 106 and 108 above the working surface, and can be made of opaque material, preferably plastic.

Figure 1:
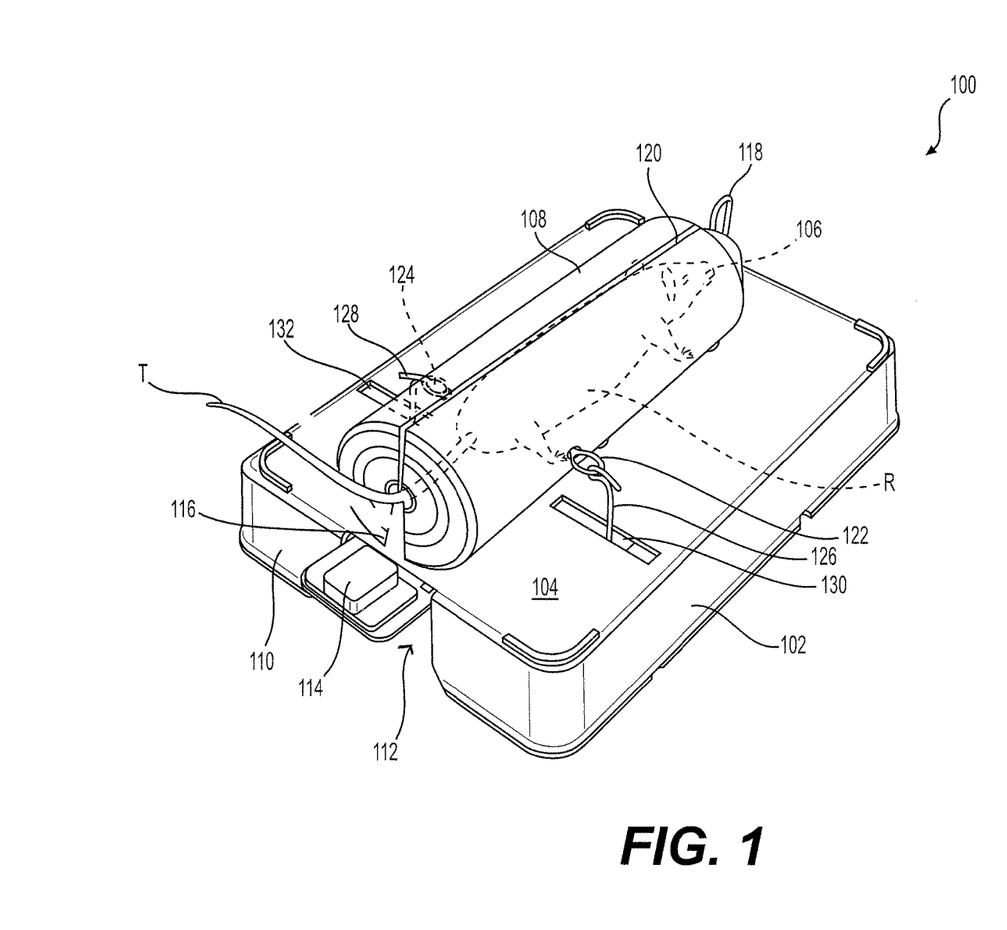
FIG. 1 is an environmental, perspective view of a push button operated rodent restrainer as described herein.
Figure 2:
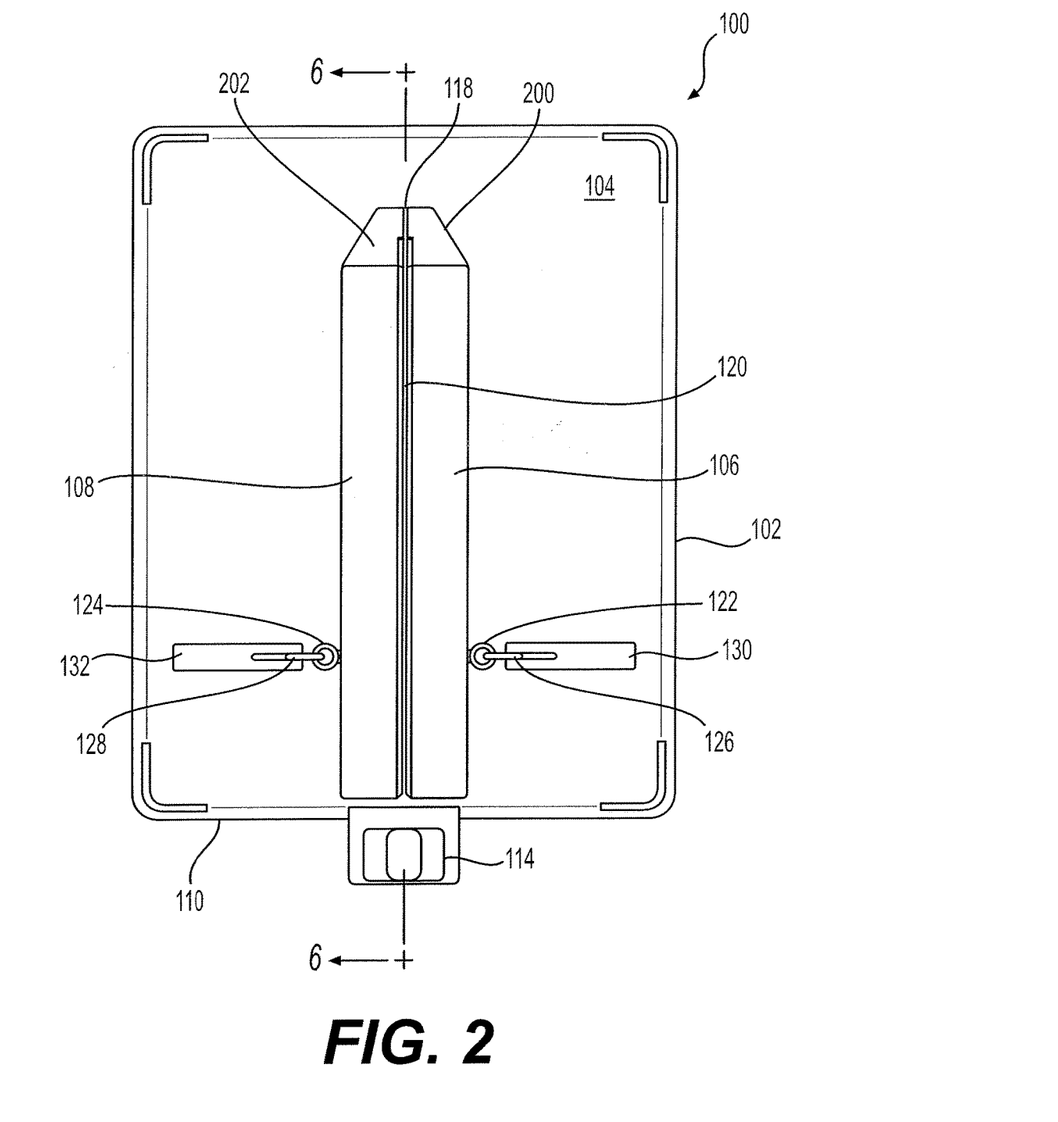
FIG. 2 is a top view of the push button operated rodent restrainer of FIG. 1, shown with the restrainer in a closed position.
Figure 3:
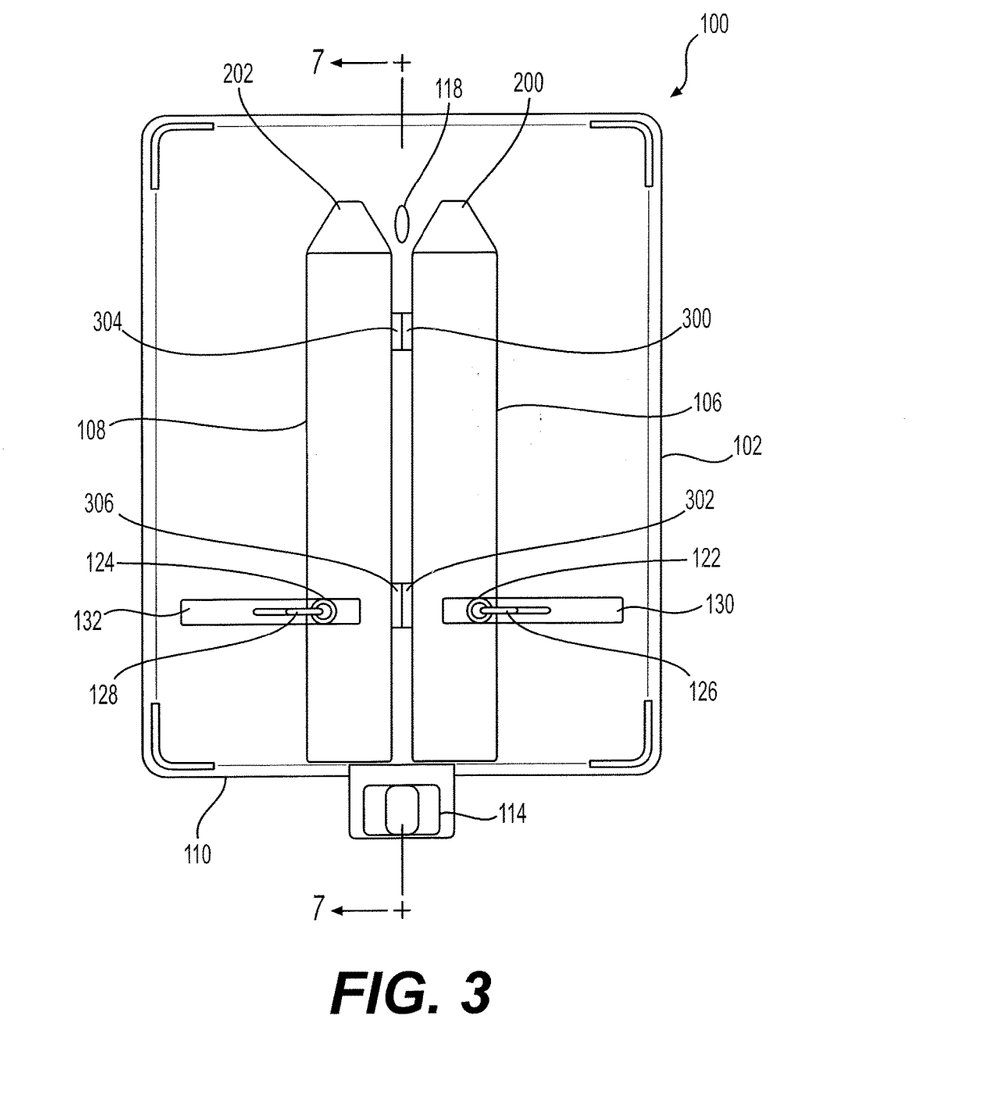
FIG. 3 is a top view of the push button operated rodent restrainer of FIG. 1, shown with the restrainer in an open position.
Figure 4:
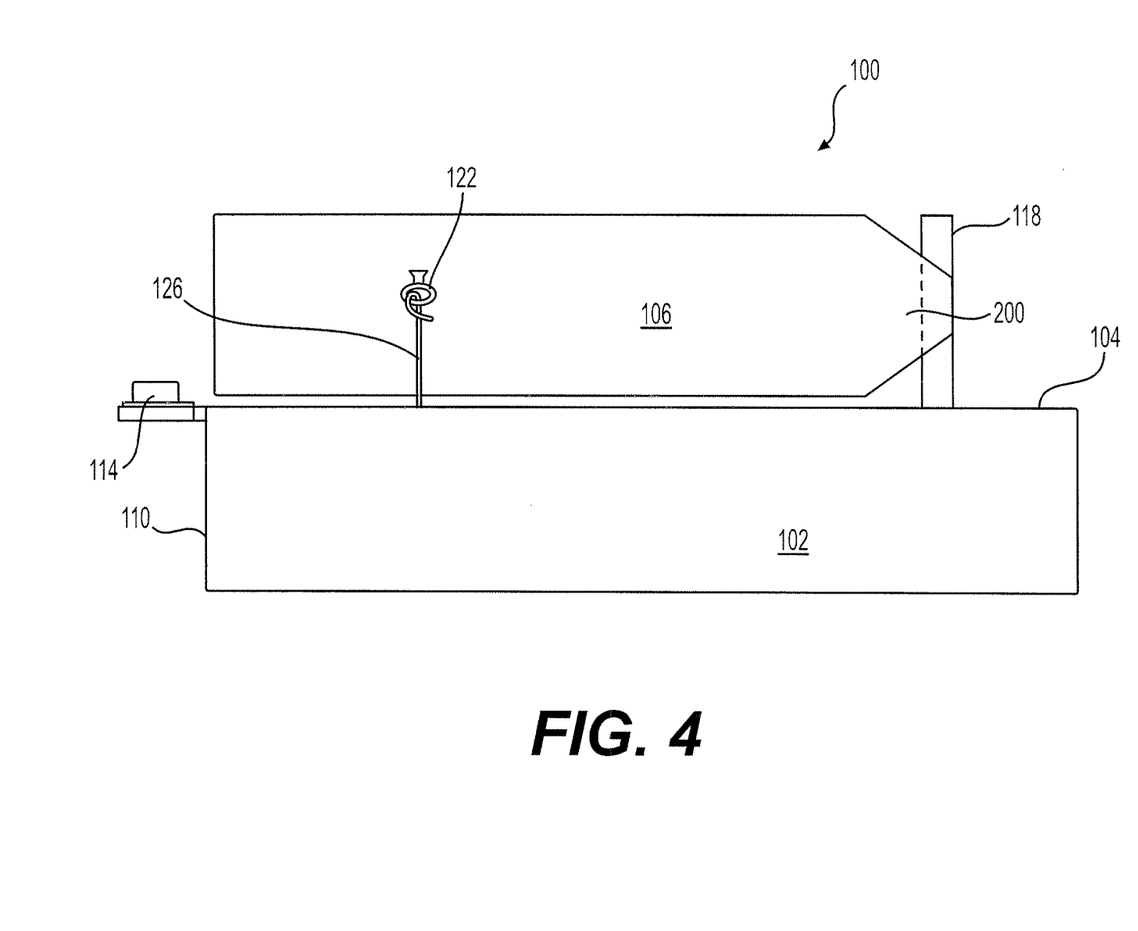
FIG. 4 is a right side view of the push button operated rodent restrainer of FIG. 1, shown with the restrainer in the closed position.

As shown in FIG. 2, the push button operated mechanism includes a first ring or operating loop 122 rigidly attached to and extending from the first housing 106 and a second ring or operating loop 124 rigidly attached to and extending from the second housing 108. A first linkage 126 has a first end hook attached to the first operating loop 122, and a second linkage 128 has a first end hook attached to the second operating loop 124. The linkages 126 and 128 extend through slots 130 and 132 in the top plate 104 of the base 102, respectively, and are connected at their second ends to internal components of the push button operated mechanism, as described below. As best seen in FIG. 2, the first housing 106 includes a first semi-frustoconical section 200 and the second housing 108 includes a second semi-frustoconical section 202 at their second ends, such that the tube includes a tapered section surrounding the rodent's snout when the housings 106 and 108 are in the closed position. +As best seen in FIG. 3, the first housing 106 is pivotally attached to the upper surface of the top plate 104 of the base 102 by a first hinge 300 and a second hinge 302, while the second housing 108 is pivotally attached to the upper surface of the top plate 104 of the base 102 by a third hinge 304 and a fourth hinge 306. The hinges 300, 302, 304 and 306, allow the first housing 106 and the second housing 108 to pivot between their open and closed positions, while maintaining their parallel relationship.

Figure 5:
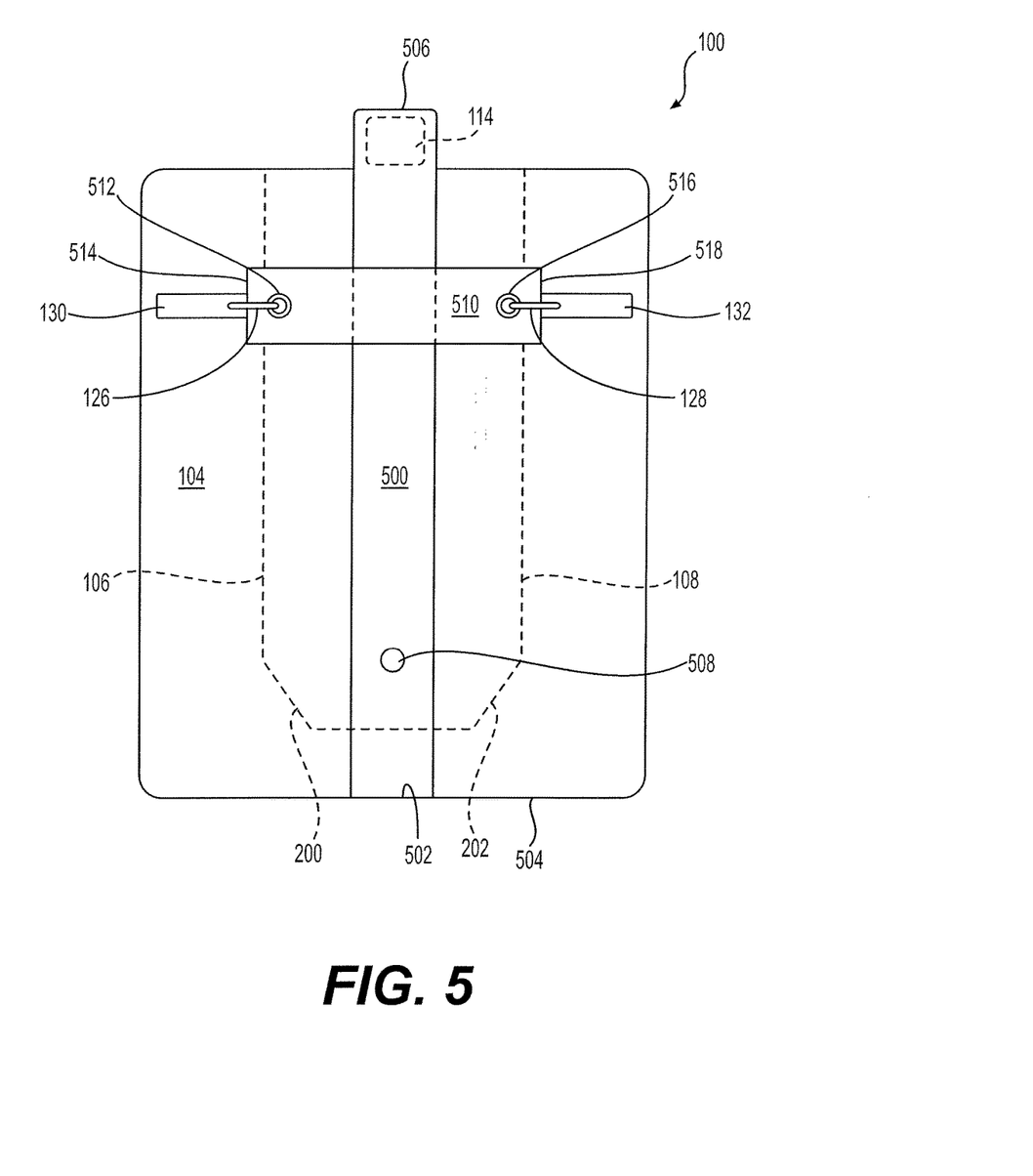
FIG. 5 is a bottom view of the push button operated rodent restrainer of FIG. 1.

FIG. 5 shows a bottom view of the push button operated rodent restrainer 100. While in the shown embodiment, the bottom of the push button operated rodent restrainer 100 is open, a bottom plate may be provided to cover the internal components of the push button operated mechanism. A flexible, resilient lever or bar 500 extends along the longitudinal axis of the base 102 and has a first end 502 that abuts a rear wall 504 of the base 102. The flexible lever may be made from a flat bar or strip of spring steel. A second end 506 of the bar 500 includes the push button 114 mounted thereon. The bar 500 is mounted on a lower surface of the top plate 104 using a rivet 508 or other suitable fastener that extends through the bar 500 proximate its first end 502 and through the top plate 104. A cross member 510 is attached to the bar 500 proximate its second end 506 and extends perpendicular to the bar 500. The cross member 510 includes a first hole 512 on a first end 514 thereof and a second hole 516 on a second end 518 thereof. The first linkage 126 is connected at its second end to the cross member 510 by extending below the first end 514 of the cross member 510 and looping back through the first hole 512 and around the first end 514 of the cross member 510. The second linkage 128 is connected at its second end to the cross member 510 by extending below the second end 518 of the cross member 510 and looping back through the second hole 516 and around the second end 518 of the cross member 510.

Figure 6:
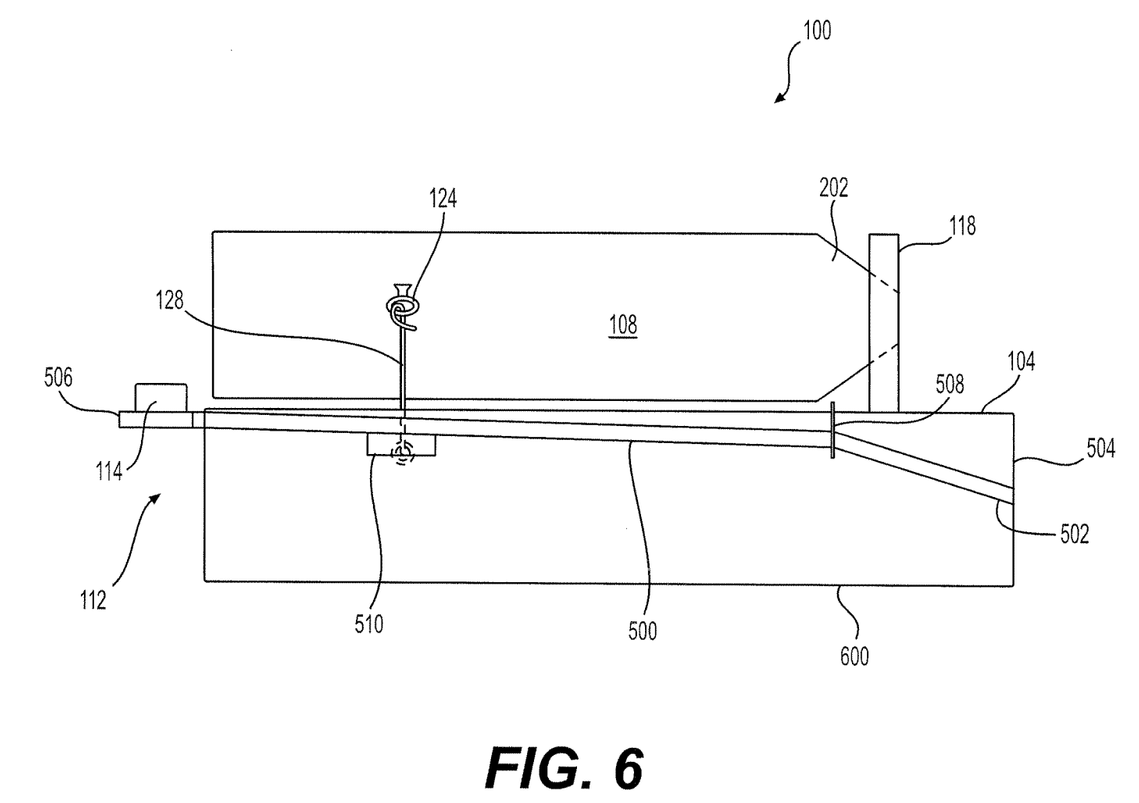
FIG. 6 is a section view through lines 6-6 of FIG. 2.
Figure 7:
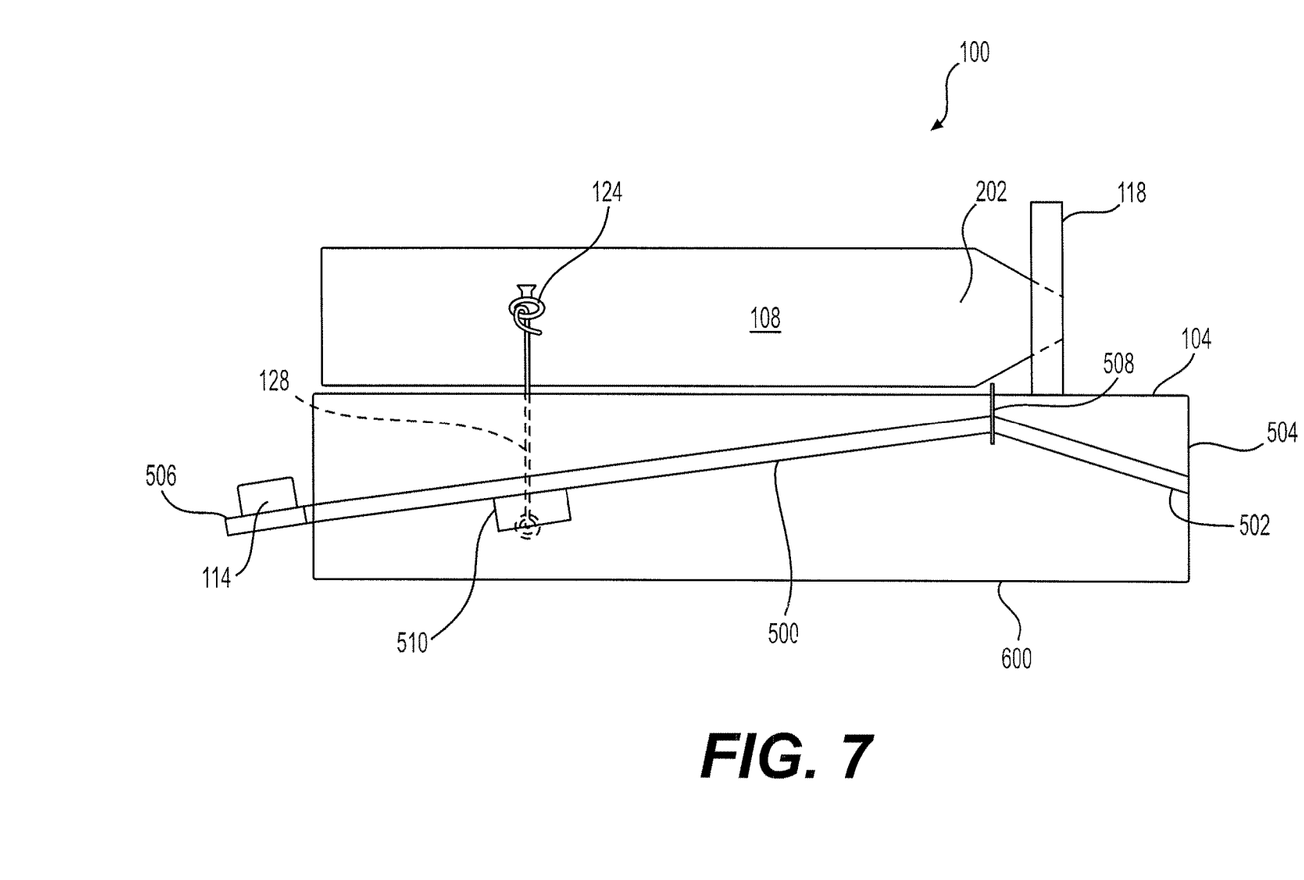
FIG. 7 is a section view through lines 7-7 of FIG. 3.

The operation of the push button operated rodent restrainer 100, will now be described with respect to FIGS. 6-7. Note that in FIGS. 6-7 the restrainer 100 is shown with an optional bottom plate 600 to cover the internal components of the push button operated mechanism. In FIG. 6, the push button operated rodent restrainer 100 is shown in its closed position. In this position, no force is applied to the push button 114, and flexible bar 500 is in its relaxed, upward position. The cross member 510 pushes linkages 126 and 128 upward, and the linkages 126 and 128 push against the first operating loop 122 and the second operating loop 124, respectively, thereby pivoting the first housing 106 and the second housing 108 toward each other to their closed positions. This position is maintained, in part, by the rivet 508 and the first end 502 of the bar 500 abutting the rear wall 504 of the base 102. In FIG. 7, the push button operated rodent restrainer 100 is shown in its open position. In this position, force is applied to the push button 114, and the bar 500 is in its spring-loaded downward position against the anchor of the rivet 508 and the first end 502 of bar 500 abutting the rear wall 504 of the base 102. The cross member 510 pulls linkages 126 and 128 downward, and the linkages 126 and 128 pull against the first operating loop 122 and the second operating loop 124, respectively, thereby pivoting the first housing 106 and the second housing 108 apart to their open positions. When the downward force or pressure is released from the push button, 114, the lever or bar 500 resiliently returns to the upward position shown in FIG. 6, returning the housing components 106, 108 to the closed position.

It is to be understood that the push button operated rodent restrainer is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A push button operated rodent restrainer, comprising:
a base having a top plate, the top plate having an upper surface and a lower surface, the base has a rear wall and a front wall having an opening defined therein;
a first half-cylinder housing pivotally mounted on the upper surface of the top plate, the first half-cylinder housing having a first end and a second end;
a second half-cylinder housing pivotally mounted on the upper surface of the top plate, the second half-cylinder housing having a first end and a second end, the first and second half-cylinder housings being pivotal between a normally closed position in which the housings are pivoted towards each other to form a substantially closed tube adapted for restraining the rodent and an open position in which the housings are pivoted away from each other sufficient to release the rodent;
a resilient lever mounted on the base, the lever being biased to maintain the first and second half-cylinder housings in the normally closed position and being actuatable to pivot the first and second half-cylinder housings to the open position, the resilient lever has a first end and a second end, the first end abutting the rear wall of the base, the second end extending outside the base through the opening in the front wall of the base, the lever being attached to the lower surface of the top plate of the base between the first end and the second end of the lever;
a cross member having a first end and a second end, the cross member being attached to the resilient lever proximate the second end of the resilient lever;
a push button mounted on the second end of the resilient lever, so that when the push button is not depressed, the resilient lever is in a relaxed upward position, and when the push button is depressed, the resilient lever counteracts the resilient bias of the lever;
a first operating loop attached to and extending from the first housing;
a second operating loop attached to and extending from the second housing;
a first linkage having a first end attached to the first operating loop and a second end attached to the first end of the cross member; and
a second linkage having a first end attached to the second operating loop and a second end attached to the second end of the cross member,
whereby when force is applied to the push button the cross member pulls the first and second linkages downward and thereby pulling against the first operating loop and the second operating loop, respectively, thereby pivoting the first housing and the second housing apart to their open positions, further whereby when the downward force is released from the push button, the lever resiliently returns to the upward position thereby returning the first and second housings to the closed position.

2. The push button operated rodent restrainer according to claim 1, wherein the first half-cylinder housing and the second half-cylinder are transparent.

3. The push button operated rodent restrainer according to claim 1, wherein the first half-cylinder housing and the second half-cylinder are made of transparent plastic.

4. The push button operated rodent restrainer according to claim 1, wherein the base is made of opaque plastic.

5. The push button operated rodent restrainer according to claim 1, further comprising a fastener attaching the resilient lever to the lower surface of the top plate of the base proximate the first end of the resilient lever.

6. The push button operated rodent restrainer according to claim 5, wherein the fastener is a rivet.

7. The push button operated rodent restrainer according to claim 1, wherein the cross member has a first hole defined in the first end of the cross member and a second hole defined in the second end of the cross member.

8. The push button operated rodent restrainer according to claim 1, wherein:
the second end of the first housing has a first semi-frustoconical section;
the second end of the second housing has a second semi-frustoconical section, so that when the housings are in the normally closed position, the substantially closed tube includes a tapered section formed by the first and second semi-frustoconical sections.

9. The push button operated rodent restrainer according to claim 1, wherein:
the first end of the first half-cylinder housing is flat and extends laterally, the first end of the first half-cylinder housing having a first half-slot formed therein;
the first end of the second half-cylinder housing is flat and extends laterally, the first end of the second half-cylinder housing having a second half-slot formed therein, so that when the housings are in the normally closed position, the substantially closed tube includes a first flat, laterally extending end of the tube having a slot formed by the first and second half-slots.

10. The push button operated rodent restrainer according to claim 1, further comprising a centrally disposed, stationary barrier extending vertically from the upper surface of the top plate between the housings, so that when the housings are in the normally closed position, a small longitudinal slit remains between the housings.

11. The push button operated rodent restrainer according to claim 10, wherein the centrally disposed, stationary barrier is made of metal.

12. The push button operated rodent restrainer according to claim 1, further comprising hinges pivotally attaching the first and second half-cylinder housings to the upper surface of the top plate of the base.

13. The push button operated rodent restrainer according to claim 1, wherein said resilient lever is made from spring steel.

* * * * *